(12) United States Patent
Viebrock

(10) Patent No.: US 9,427,103 B1
(45) Date of Patent: Aug. 30, 2016

(54) TANGENTIAL APPLE SLICER

(71) Applicant: Michael Viebrock, Palm Harbor, FL (US)

(72) Inventor: Michael Viebrock, Palm Harbor, FL (US)

(*) Notice: Subject to any disclaimer, the term of this patent is extended or adjusted under 35 U.S.C. 154(b) by 109 days.

(21) Appl. No.: 14/560,647

(22) Filed: Dec. 4, 2014

(51) Int. Cl.
  *A47J 25/00* (2006.01)
  *B26B 3/04* (2006.01)
  *B26D 3/26* (2006.01)

(52) U.S. Cl.
  CPC ............... *A47J 25/00* (2013.01); *B26B 3/04* (2013.01); *B26D 3/26* (2013.01)

(58) Field of Classification Search
  CPC ............ A47J 25/00; B26D 3/26; B26B 3/04
  USPC .......................................................... 30/114
  See application file for complete search history.

(56) References Cited

U.S. PATENT DOCUMENTS

| | | | | |
|---|---|---|---|---|
| 1,466,114 A * | 8/1923 | Buchi | | B26D 3/26 30/202 |
| 1,744,422 A * | 1/1930 | Taylor | | A47J 25/00 30/302 |
| 1,864,147 A * | 6/1932 | Rantine | | B26D 3/185 30/303 |
| D114,471 S * | 4/1939 | Rosenberg | | B26D 3/185 D7/412 |
| 2,397,007 A * | 3/1946 | Hosmer | | A47J 25/00 30/302 |
| 4,497,245 A * | 2/1985 | Mori | | A23N 7/002 99/542 |
| 4,970,786 A * | 11/1990 | Harper | | A47J 17/04 30/113.1 |
| 5,363,756 A * | 11/1994 | Muro | | B26D 1/0006 83/435.15 |
| 5,421,249 A * | 6/1995 | Repisky | | A23N 4/00 83/435.19 |
| 5,903,981 A * | 5/1999 | Grow, II | | A47G 21/045 30/114 |
| D432,874 S * | 10/2000 | Kari | | B26D 3/185 D7/673 |
| 6,381,851 B1 * | 5/2002 | Meyer | | A21C 15/04 294/99.2 |
| D501,371 S * | 2/2005 | Lo | | B26D 3/185 D7/673 |
| D508,383 S * | 8/2005 | Endres | | B26D 3/185 D7/673 |
| D535,164 S * | 1/2007 | St. Germain | | A47J 25/00 D7/674 |
| D550,521 S * | 9/2007 | Roberson | | A47J 25/00 D7/672 |
| 7,836,822 B2 * | 11/2010 | Cheng | | A47J 25/00 83/114 |
| 2004/0117989 A1 * | 6/2004 | Horng | | B26D 3/26 30/114 |
| 2005/0150117 A1 * | 7/2005 | Walzak | | A47J 25/00 30/302 |
| 2006/0117966 A1 * | 6/2006 | Chang | | A47J 25/00 99/545 |
| 2009/0241344 A1 * | 10/2009 | Mastroianni | | A47J 25/00 30/114 |
| 2009/0249965 A1 * | 10/2009 | Hauser | | A47J 25/00 99/552 |
| 2009/0266246 A1 * | 10/2009 | Hood | | A47J 25/00 99/565 |
| 2009/0282990 A1 * | 11/2009 | Farnum | | B26D 3/26 99/537 |
| 2014/0290069 A1 * | 10/2014 | White, III | | B26D 3/24 30/114 |
| 2016/0021892 A1 * | 1/2016 | Avila Macias | | A21C 15/04 30/114 |
| 2016/0100589 A1 * | 4/2016 | Boulrece | | A21C 15/04 83/52 |

* cited by examiner

*Primary Examiner* — Sean Michalski

(57) ABSTRACT

An interior cylinder has an upper edge and a lower edge. The lower edge of the interior cylinder is a knife edge. An exterior cylinder has an upper edge and a lower edge. A plurality of similarly configured blades each have an inner end attached to the interior cylinder. The inner ends are attached at equally spaced points. Each blade has an outer end attached to the exterior cylinder. The outer ends are attached at equally spaced points. Each blade has an upper edge and a lower edge. The lower edge of each blade is a knife edge. Each blade is attached tangentially to the interior cylinder. When an apple is cut by the knife edges of the interior cylinder and the blades, the apple will be cut into a plurality of similarly configured wedges with a tip in a scoop-shaped configuration.

5 Claims, 2 Drawing Sheets

TANGENTIAL APPLE SLICER

BACKGROUND OF THE INVENTION

Field of the Invention

The present invention relates to a tangential apple slicer and more particularly pertains to cutting apples into uniquely shaped apple wedges and forming scoop shaped tips in the apple wedges, the cutting and the forming being done in a safe, eye-appealing, convenient, and economical manner.

SUMMARY OF THE INVENTION

In view of the foregoing disadvantages inherent in the known types of slicer of known designs and configurations now present in the prior art, the present invention provides an improved tangential apple slicer. As such, the general purpose of the present invention, which will be described subsequently in greater detail, is to provide a new and improved tangential apple slicer and method which has all the advantages of the prior art and none of the disadvantages.

From a broad viewpoint, the present invention is a tangential apple slicer. First provided is an interior cylinder having an upper edge and a lower edge. The lower edge of the interior cylinder is a knife edge. Next provided is an exterior cylinder having an upper edge and a lower edge. A plurality of similarly configured blades is provided. Each blade has an inner end attached to the interior cylinder. The inner ends are attached to the interior cylinder at equally spaced points. Each blade has an outer end. The outer ends are attached to the exterior cylinder at equally spaced points. Each blade has an upper edge and a lower edge. The lower edge of each blade is a knife edge. Each blade is attached tangentially to the interior cylinder. In this manner when an apple is cut by the knife edges of the interior cylinder and the blades, the apple will be cut into a plurality of similarly configured wedges with a tip in a scoop-shaped configuration.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is, therefore, an object of the present invention to provide a new and improved tangential apple slicer which has all of the advantages of the prior art slicer of known designs and configurations and none of the disadvantages.

It is another object of the present invention to provide a new and improved tangential apple slicer which may be easily and efficiently manufactured and marketed.

It is a further object of the present invention to provide a new and improved tangential apple slicer which is of durable and reliable constructions.

An even further object of the present invention is to provide a new and improved tangential apple slicer which is susceptible of a low cost of manufacture with regard to both materials and labor, and which accordingly is then susceptible of low prices of sale to the consuming public, thereby making such tangential apple slicer economically available to the buying public.

Lastly, another object of the present invention is to provide a tangential apple slicer for cutting apples into uniquely shaped apple wedges and forming scoop shaped tips in the apple wedges, the cutting and the forming being done in a safe, eye-appealing, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
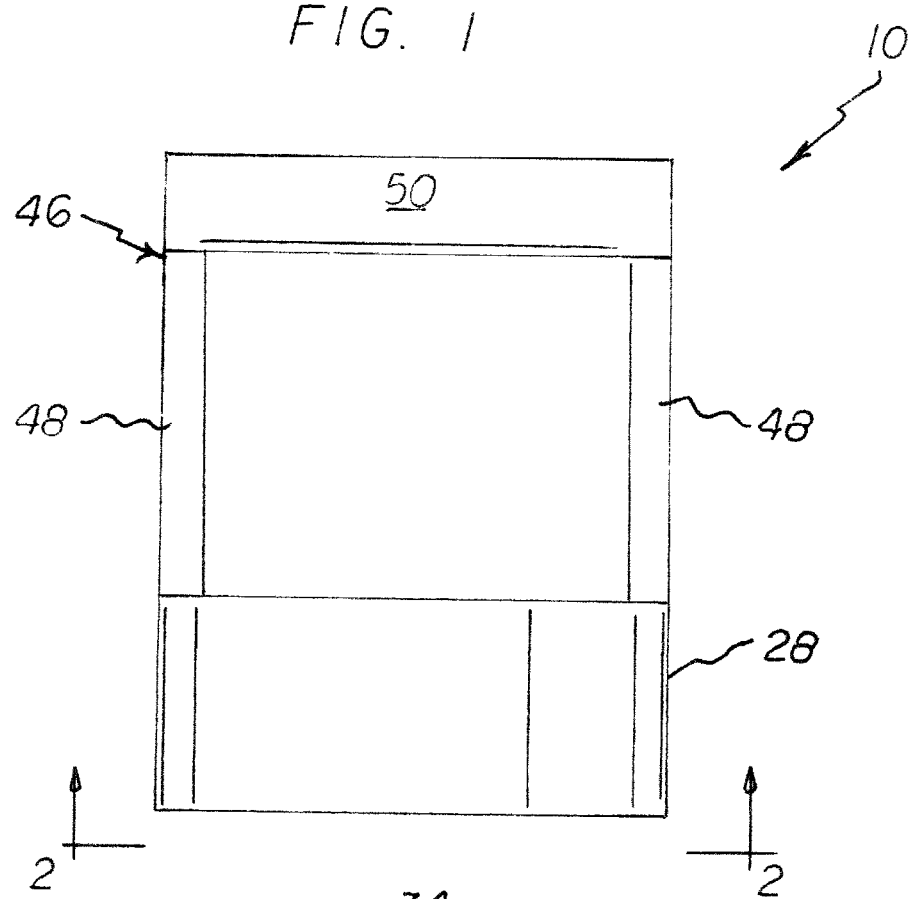
FIG. 1 is a front elevational view of a tangential apple slicer constructed in accordance with the principles of the present invention.
Figure 2:
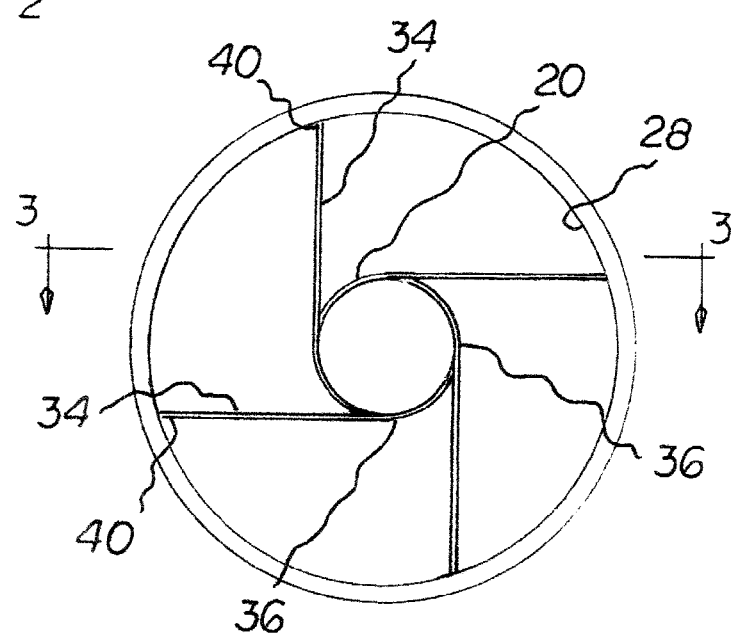
FIG. 2 is a bottom view taken along line 2-2 of FIG. 1.
Figure 3:
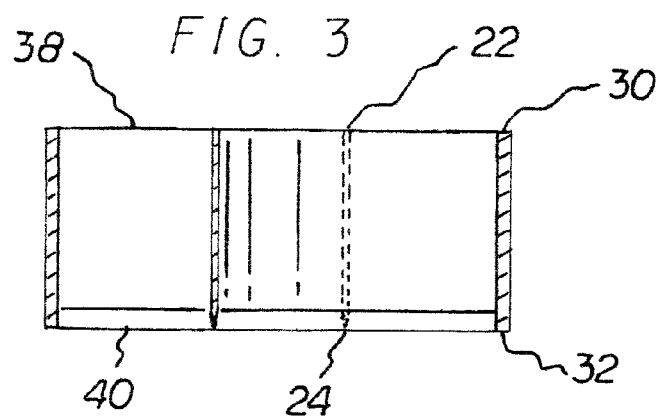
FIG. 3 is a cross sectional view taken along line 3-3 of FIG. 2.
Figure 4:
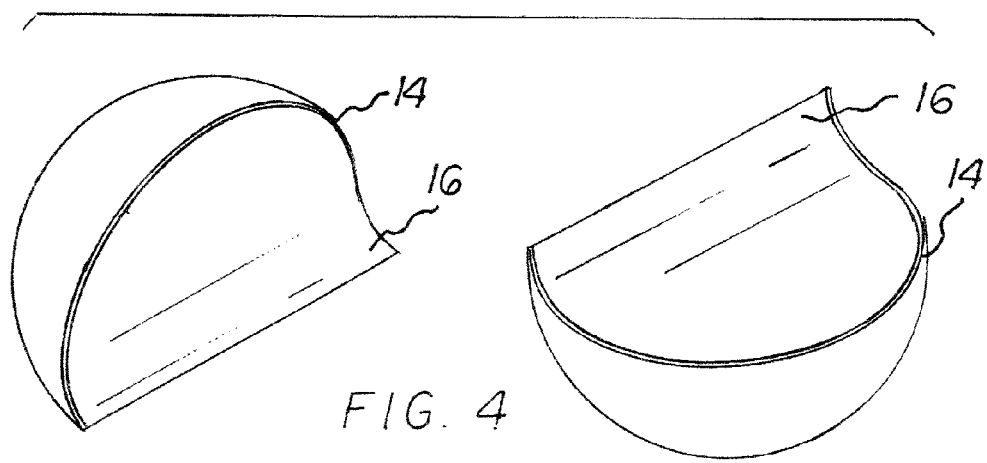
FIG. 4 are illustrations of apple slices made with the system of the prior Figures.

With reference now to the drawings, and in particular to FIG. 1 thereof, the preferred embodiment of the new and improved tangential apple slicer embodying the principles and concepts of the present invention and generally designated by the reference numeral 10 will be described.

The present invention, the tangential apple slicer 10 is comprised of a plurality of components. Such components in their broadest context include an exterior cylinder and a plurality of similarly configured blades. Such components are individually configured and correlated with respect to each other so as to attain the desired objective.

From a specific viewpoint, the present invention is a tangential apple slicer. First provided is an interior cylinder 20. The interior cylinder has an upper edge 22 and a lower edge 24. The upper edge and the lower edge are separated by a height of 3 inches, plus or minus 20 percent. The interior cylinder has a diameter of from 1.0 to 1.25 inches. The interior cylinder has a central axis. The interior cylinder has a thickness of 0.125 inches, plus or minus 20 percent. The lower edge of the interior cylinder is a knife edge. The interior cylinder is fabricated of stainless steel.

Provided next is an exterior cylinder 28. The exterior cylinder has an upper edge 30 and a lower edge 32. The upper edge and the lower edge are separated by a height of 3 inches, plus or minus 20 percent. The exterior cylinder has a diameter of from 4 to 6 inches. The exterior cylinder has a central axis. The central axis of the exterior cylinder is provided co-extensive with the central axis of the interior cylinder. The exterior cylinder has a thickness of 0.25 inches, plus or minus 20 percent. The lower edge of the exterior cylinder is a knife edge. The exterior cylinder is fabricated of stainless steel.

Further provided are four similarly configured blades 36. Each blade has an inner end 38. The inner end is attached to the interior cylinder. The inner end is attached at equally spaced points. Each blade has an outer end 40. The outer end is attached to the exterior cylinder. The outer end is attached at equally spaced points. Each blade has a length of from 1.5 to 2.0 inches. Each blade has an upper edge 42. Each blade has a lower edge 44. The upper edge and the lower edge are separated by a height of 3 inches, plus or minus 20 percent. Each blade has a thickness of 0.125 inches, plus or minus 20 percent. The lower edge of each blade is a knife edge. Each blade is fabricated of stainless steel. Each blade is attached tangentially to the interior cylinder. Each blade is attached non-radially to the exterior cylinder. In this manner when an apple is cut by the knife edges of the interior cylinder and the blades, the apple will be cut into four similarly configured wedges. The wedges have a tip 16. The tip is scoop-shaped in configuration. The scoop-shaped configuration corresponds to 25 percent of the interior cylinder. In this manner dripping is facilitated.

Provided last is a handle 46. The handle includes two vertical posts 48. The posts extend upwardly from the upper edge of the exterior cylinder. The post extend at diametrically opposed locations. The handle includes a gripping section 50. The gripping section is coupled to the two vertical posts. The gripping section constitutes a gripping area. In this manner handling of the system is facilitated.

Figure 5:
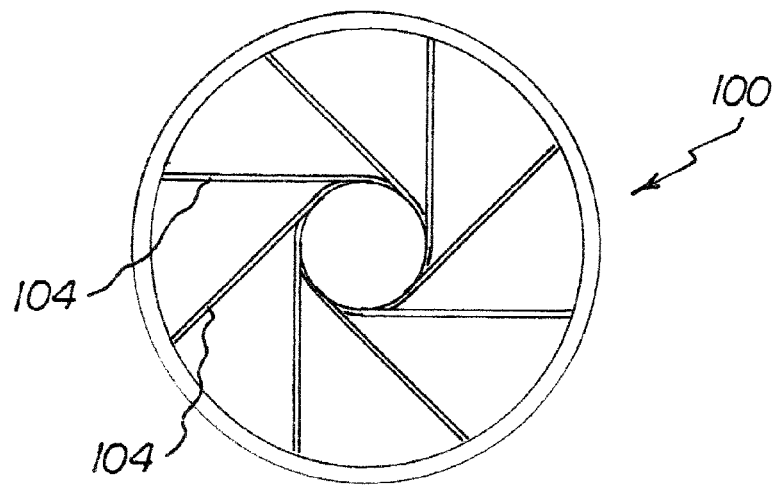
FIG. 5 is a bottom view similar to FIG. 2 but illustrating an alternate embodiment of the invention.

An alternate embodiment of the invention is shown in FIG. 5. In this alternate embodiment, the tangential apple slicer 100 as set forth in claim 1 wherein the plurality of blades is eight blades 104.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tangential apple slicer comprising:
    an interior cylinder having an upper edge and a lower edge, the lower edge of the interior cylinder being a knife edge;
    an exterior cylinder having an upper edge and a lower edge;
    a plurality of similarly configured blades, each blade having an inner end attached to the interior cylinder at equally spaced points, each blade having an outer end attached to the exterior cylinder at equally spaced points, each blade having an upper edge and a lower edge, the lower edge of each blade being a knife edge, each blade being attached tangentially to the interior cylinder whereby when an apple is cut by the knife edges of the interior cylinder and the blades, the apple will be cut into a plurality of similarly configured wedges with a tip in a scoop-shaped configuration.

2. The system as set forth in claim 1 and further including:
    a handle including two vertical posts extending upwardly from the upper edge of the exterior cylinder at diametrically opposed locations with a grip coupled to the two vertical posts to facilitate handling of the system.

3. The system as set forth in claim 1 wherein the plurality of blades is four blades.

4. The system (100) as set forth in claim 1 wherein the plurality of blades is eight blades (104).

5. A tangential apple slicer (10) for cutting apples into uniquely shaped apple wedges (14) and forming scoop shaped tips (16) in the apple wedges, the cutting and the forming being done in a safe, eye-appealing, convenient, and economical manner, the system comprising, in combination:
    an interior cylinder (20) having an upper edge (22) and a lower edge (24) separated by a height of 3 inches, plus or minus 20 percent, the interior cylinder having a diameter of from 1.0 to 1.25 inches with a central axis, the interior cylinder having a thickness of 0.125 inches, plus or minus 20 percent, the lower edge of the interior cylinder being a knife edge, the interior cylinder being fabricated of stainless steel;
    an exterior cylinder (28) having an upper edge (30) and a lower edge (32) separated by a height of 3 inches, plus or minus 20 percent, the exterior cylinder having a diameter of from 4 to 6 inches with a central axis co-extensive with the central axis of the interior cylinder, the exterior cylinder having a thickness of 0.25 inches, plus or minus 20 percent, the lower edge of the exterior cylinder being a knife edge, the exterior cylinder being fabricated of stainless steel;
    four similarly configured blades (36), each blade having an inner end (38) attached to the interior cylinder at equally spaced points, each blade having an outer end (40) attached to the exterior cylinder at equally spaced points, each blade having a length of from 1.5 to 2.0 inches, each blade having an upper edge (42) and a lower edge (44) separated by a height of 3 inches, plus or minus 20 percent, each blade having a thickness of 0.125 inches, plus or minus 20 percent, the lower edge of each blade being a knife edge, each blade being fabricated of stainless steel, each blade being attached tangentially to the interior cylinder, each blade being attached non-radially to the exterior cylinder whereby when an apple is cut by the knife edges of the interior cylinder and the blades, the apple will be cut into four similarly configured wedges with the tip (16) in a scoop-shaped configuration corresponding to 25 percent of the interior cylinder to facilitate dipping; and a handle (46) including two vertical posts (48) extending upwardly from the upper edge of the exterior cylinder at diametrically opposed locations with a gripping section (50) coupled to the two vertical posts and constituting a gripping area to facilitate handling of the system.

\* \* \* \* \*